US007630822B2

(12) United States Patent
Kaneko

(10) Patent No.: US 7,630,822 B2
(45) Date of Patent: Dec. 8, 2009

(54) FUEL INJECTION SYSTEM FOR INTERNAL COMBUSTION ENGINE

(75) Inventor: Takashi Kaneko, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/010,507

(22) Filed: Jan. 25, 2008

(65) Prior Publication Data

US 2008/0195295 A1 Aug. 14, 2008

Related U.S. Application Data

(62) Division of application No. 11/094,082, filed on Mar. 31, 2005, now Pat. No. 7,487,762.

(30) Foreign Application Priority Data

Mar. 31, 2004 (JP) ............................ 2004-108154

(51) Int. Cl.
*F02M 23/00* (2006.01)
*B60T 7/12* (2006.01)

(52) U.S. Cl. ........................ 701/103; 123/531; 123/533

(58) Field of Classification Search ................. 701/103; 123/575, 576, 577, 578, 527, 531, 533, 27 GE, 123/27 A
See application file for complete search history.

(56) References Cited

U.S. PATENT DOCUMENTS

| | | | | |
|---|---|---|---|---|
| 4,381,077 | A * | 4/1983 | Tsumura et al. | 239/89 |
| 4,430,978 | A * | 2/1984 | Lewis et al. | 123/478 |
| 4,693,224 | A * | 9/1987 | McKay | 123/531 |
| 4,823,756 | A * | 4/1989 | Ziejewski et al. | 123/531 |
| 4,876,989 | A | 10/1989 | Karpuk et al. | |
| 4,899,714 | A * | 2/1990 | Schechter et al. | 123/533 |
| 5,067,467 | A * | 11/1991 | Hill et al. | 123/497 |
| 5,315,973 | A * | 5/1994 | Hill et al. | 123/304 |
| 5,485,818 | A * | 1/1996 | McCandless | 123/294 |
| 5,549,083 | A | 8/1996 | Feuling | |
| 5,626,294 | A * | 5/1997 | McCandless | 239/533.3 |
| 5,996,558 | A * | 12/1999 | Ouellette et al. | 123/506 |
| 6,161,527 | A * | 12/2000 | Ruman | 123/533 |
| 6,332,448 | B1 | 12/2001 | Ilyama et al. | |
| 6,752,131 | B2 * | 6/2004 | Poola et al. | 123/533 |
| 6,955,156 | B2 * | 10/2005 | Noda et al. | 123/364 |

(Continued)

FOREIGN PATENT DOCUMENTS

JP 2000-120493 4/2000

(Continued)

*Primary Examiner*—Mahmoud Gimie
(74) *Attorney, Agent, or Firm*—Wenderoth, Lind & Ponack, L.L.P.

(57) ABSTRACT

A fuel injection system for an internal combustion engine has a lubricity improver supply for adding a lubricity improver to low-viscosity fuel supplied to a fuel injection apparatus of the engine. A controller controls the lubricity improver supply so that the amount of the lubricity improver added to fuel at the inlet to the fuel injection apparatus is increased as engine rotation speed, engine load, or injection pressure is increased. With the system, wear or sticking of the plunger can be prevented even when low-viscosity fuel is used by improving lubrication conditions to secure necessary lubrication condition for the sliding part in accordance with engine operation conditions, fuel temperature and viscosity.

16 Claims, 8 Drawing Sheets

U.S. PATENT DOCUMENTS 6,955,161 B2 * 10/2005 Suzuki et al. ............... 123/533
2002/0053332 A1 5/2002 Chamberlin et al.
2002/0053334 A1 5/2002 Chamberlin et al.
2002/0073976 A1 * 6/2002 Leung et al. ................ 123/533
2003/0111064 A1 * 6/2003 Leung et al. ................ 123/533
2004/0007216 A1 * 1/2004 Tamura et al. .............. 123/531
2004/0007217 A1 * 1/2004 Poola et al. ................. 123/533
2006/0054141 A1 3/2006 Nozaki et al.
2007/0084447 A1 4/2007 Nozaki et al.

FOREIGN PATENT DOCUMENTS

JP 2002-309979 10/2002

* cited by examiner

FUEL INJECTION SYSTEM FOR INTERNAL COMBUSTION ENGINE

This is a divisional application of U.S. patent application Ser. No. 11/094,082, filed Mar. 31, 2005 now U.S. Pat. No. 7,487,762.

BACKGROUND OF THE INVENTION

1. Field of the Invention

The present invention relates to a fuel injection system for a reciprocating internal combustion engine, specifically to a fuel injection system for using low viscosity fuel such as alternate fuel to substitute for petroleum fuel.

2. Description of the Related Art

Oil resources are thought to be depleted in the future. To meet the depletion of oil resources, internal combustion engines that use biofuel or reformed natural gas such as DME (dimethyl ether) are disclosed (for example, see Japanese Laid-Open Patent Application No. 2002-309979, No. 2000-120493).

The art disclosed in Japanese Laid-Open Patent Application No. 2002-309979 is to use biogas together with light oil and biofuel is introduced to the suction pipe of the engine. In the art disclosed in Japanese Laid-Open Patent Application No. 2000-120493, liquid dimethyl ether is compressed to high pressure in a fuel injection pump and injected into the combustion chamber of the engine.

There are some kinds of biofuel having a viscosity higher or lower than the usual petroleum fuel. Alternate fuel used to substitute for petroleum, fuel such as DME and GTL, has generally low viscosity in a liquid state. There occurs a problem of insufficient lubrication when compressing low viscosity fuel to high pressure in the fuel injection pump to inject into the combustion chamber of a reciprocating internal engine.

The art disclosed in Japanese Laid-Open Patent Application No. 2002-120493 is the case where an in-line fuel injection pump is used, and proposes a fuel injection system that enables to solve the problem of insufficient lubrication of tappets. This disclosure is applied to the case where fuel injection pressure is not so high and particular consideration is not given to the lubrication of the sliding part of the plunger in a very high pressure injection pump.

When fuel injection pressure is increased in an engine using alternate fuel to substitute for petroleum fuel, it is absolutely necessary to take measures to prevent the occurrence of wear or sticking of the plunger of the fuel injection pump due to insufficient lubrication in the sliding part of the plunger by securing good lubrication, for the alternate fuel has generally low viscosity and poor lubricity.

It is thinkable to add a lubricity improver to fuel in order to secure proper lubrication in the sliding part of the plunger in an engine using low viscosity fuel such as the alternate fuel to substitute for petroleum fuel. However, it is difficult to control so that an additive supplied to a fuel tank is in an appropriate amount for the fuel in the fuel tank.

Further, as the lubricity of fuel in the sliding part of the plunger varies according to the temperature of the fuel in the sliding part, it is necessary to add an additive a little abundantly for safety to secure good lubrication in the sliding part. As emulsion fuel added with water and biofuel contains water, the inside wall of the fuel tank should be specially treated for rust proofing when those kinds of fuel are to be stored as they are in the tank or stored mixed with conventional fuel in the tank.

Further, biofuel is easy to vary in viscosity and other properties with time. Ethanol corrodes metal and rubber, so the fuel tank must be designed to deal with corrosion.

Therefore, in an engine using low viscosity fuel such as alternate fuel to substitute for petroleum fuel, it is desired to solve the problems as described above so that the fuel is supplied with the amount of additive necessary for the fuel in order to secure good lubrication in the sliding part of the plunger. Also, lubrication in the sliding part of the plunger can be improved by mixing biofuel of higher viscosity and conventional fuel with the low viscosity fuel instead of adding an additive for improving lubricity and controlling the viscosity of the mixed fuel so that the mixed fuel has a viscosity similar to that of conventional fuel.

As DME (dimethyl ether) evaporates at a pressure level of 6 kg/cm$^2$ at normal temperatures, it is necessary to provide a means to avoid a decrease in lubricity due to evaporation of DME in the sliding part of the plunger. However, the prior are, including the disclosures in Japanese Laid-Open Patent Applications No. 2002-309979 and No. 2000-120493, does not provide such a means to deal with the problem.

SUMMARY OF THE INVENTION

The present invention was made in light of the problems as described above, and the object is to provide a fuel injection system for an internal combustion engine, with which the occurrence of wear or sticking of the plunger of the fuel injection apparatus is prevented by keeping lubrication in the sliding part of the plunger in good condition when low-viscosity fuel is used through providing a lubricity improving means for keeping a good lubricating condition in the sliding part of the plunger in correspondence with engine operation conditions including fuel temperature and viscosity in an engine using low-viscosity fuel. Further, a decrease in lubricity when using biofuel is avoided while keeping improvements in exhaust emissions by virtue of biofuel. Still further, a decrease in lubricity when using fuel evaporating easily (under relatively low pressure) such as DME is avoided by supplying pressurized air to the sliding part of the plunger.

To achieve the object, the present invention proposes a fuel injection system for an internal combustion engine provided with a fuel injection apparatus to pressurize the low-viscosity fuel supplied by a fuel supply pump by the plunger of the apparatus to feed the pressurized fuel to a fuel injection nozzle. A lubricity improver supply means adds a lubricity improver to low-viscosity fuel supplied to the fuel injection apparatus. A controller controls the lubricity improver supply means so that the amount of addition of lubricity improver is increased as engine rotation speed, engine load, injection pressure, or fuel temperature increases.

In the invention, three ways of configuration are possible for a lubricity improver supply system, as follows:

In a first configuration, the discharge passage of a lubricity improver supply pump constituting the lubricity improver supply means is connected to a fuel passage between the fuel supply pump and a fuel inlet of the fuel injection apparatus. A non-return valve is provided in the discharge passage for permitting a lubricity improver to flow from the lubricity improver supply pump only in the direction toward the fuel injection apparatus.

In the second configuration, the discharge passage of a lubricity improver supply pump constituting the lubricity improver supply means is connected to the suction passage of the fuel supply pump. A non-return valve is provided in the discharge passage for permitting the lubricity improver to flow from the lubricity improver supply pump only in the direction toward the fuel supply pump.

In the third configuration, a suction passage of lubricity improver communicating to a lubricity improver tank is connected to the suction passage of the fuel supply pump. A variable restrictor having an opening controlled by the controller is provided in the suction passage of the lubricity improver.

In an engine provided with a fuel injection apparatus which pressurizes fuel with a plunger to send the fuel to a fuel injection nozzle, the plunger velocity increases and sticking of the plunger is apt to occur as engine rotation speed increases. the fuel injection quantity increases as engine load increases, and the fuel injection pressure increases as the fuel injection quantity increases.

Increased fuel injection pressure causes the load exerted on the plunger to increase. Therefore, the larger the fuel injection quantity and the higher the engine rotation speed is, the more severe is the lubricating condition in the sliding part of the plunger. Also, the lower the viscosity of fuel and the higher the temperature of fuel is, the more severe the lubricating condition in the sliding part of the plunger.

According to the invention, a lubricity improver is added to low-viscosity fuel when the lubricating condition in the sliding part of the plunger is severe. The amount of improver addition is controlled so that it is increased in accordance with increase in engine speed and engine load, i.e. with increase in fuel injection pressure and fuel temperature, so the amount of improver addition is increased as the lubrication condition deteriorates in the sliding part of the plunger. Therefore, the lubricating condition in the sliding part of the plunger is kept good by the addition of an appropriate amount of the improver, and the occurrence of wear or sticking of the plunger can be avoided even when low-viscosity fuel is used. Further, as an appropriate not excessive improver is supplied, expensive improver is effectively used.

It is preferable in the invention that one or both of a temperature sensor for detecting the temperature of the low-viscosity fuel after the lubricity improver is added and a viscosity sensor for detecting the viscosity of the low-viscosity fuel after the lubricity improver is added are provided. The controller calculates the amount of the lubricity improver to be supplied by the lubricity improver supply means on the basis of one or both of the detected temperature and viscosity and engine speed or load and controls the lubricity improver supply means to supply the calculated amount (flow) of lubricity improver.

Not all of the fuel supplied to the injection apparatus is injected into the combustion chamber, but a part of the fuel is returned to the fuel tank. Therefore, the concentration of lubricity improver increases gradually unless fuel is newly supplied to the fuel tank. Lubricity in the sliding part of the plunger depends mainly on the viscosity of fuel, and the viscosity varies depending on its temperature.

Therefore, by detecting the temperature and viscosity of the low-viscosity fuel after the lubricity improver is added, by calculating the required amount of the lubricity improver which depends on engine rotation speed and load on the basis of the detected temperature and viscosity, and by controlling the lubricity improver flow supplied by the lubricity improver supply means, excessive addition of the lubricity improver to the fuel inlet passage of the fuel injection apparatus can be avoided and an appropriate amount of the additive is supplied always in accordance with engine rotation speed and load.

In the invention, it is preferable that the relation between engine speed or load and the flow of low-viscosity fuel provided with the lubricity improver, so that the fuel provided with the lubricity improver has proper lubricity, is set beforehand in the controller. The flow of the lubricity improver supplied by the lubricity improver supply means is controlled by the controller so that the flow of the lubricity improver is related to the preset flow of the low-viscosity fuel.

With the configuration like this, by establishing beforehand the relation between engine operating conditions and the flow of low-viscosity fuel provided with the lubricity improver so that the fuel provided with the lubricity improver has proper lubricity, and by controlling the lubricity improver flow in relation to the low-viscosity fuel flow established beforehand, the amount of lubricity improver appropriate for engine speed and load can always be added to low-viscosity fuel with a simple configuration and accordingly at low cost without providing the temperature and viscosity detecting means.

Further, the present invention proposes a fuel injection system for an internal combustion engine provided with a fuel injection apparatus to pressurize a low-viscosity fuel supplied by a fuel supply pump by a plunger of the apparatus to feed the pressurized fuel to a fuel injection nozzle. A biofuel supply means supplies biofuel to be mixed with the fuel supplied to the fuel injection apparatus of the engine. A controller controls the biofuel supply means so that the amount of addition of biofuel is decreased as the engine rotation speed or engine load is increased.

In the invention, it is preferable that the discharge passage of the biofuel supply pump constituting the biofuel supply means is connected to a fuel passage between the fuel supply pump and the fuel inlet of the fuel injection apparatus. A non-return valve is provided in the discharge passage for permitting biofuel to flow from the lubricity improver supply pump only in the direction toward the fuel injection apparatus.

When biofuel, which is superior in regard to the generation of NOx, exhaust smoke, and exhaust emission, is mixed with conventional fuel and the mixed fuel is injected into the combustion chamber of the engine, exhaust emission is improved. On the other hand, the viscosity of biofuel changes with age, and when the percentage of biofuel is increased, lubricating condition in the sliding part of the plunger may deteriorate.

However, in the present invention, by controlling the system so that the percentage of biofuel is decreased as the lubricating conditions in the sliding part of the plunger become severe with increased engine speed or load, the occurrence of wear or stick of the plunger can be avoided while achieving improvement in exhaust gas by reducing NOx and exhaust smoke density by virtue of biofuel.

Further, by controlling to adjust the mixing ratio of biofuel to conventional fuel, or mixing ratios of three kinds of fuel, DME and GTL and conventional fuel to be supplied to the fuel injection apparatus, the viscosity of the mixed fuel can be adjusted, and an expensive lubricity improver is not required.

In the invention, it is preferable that a temperature sensor for detecting the temperature of fuel after biofuel is added and a viscosity sensor for detecting the viscosity of fuel after biofuel is added are provided. The controller calculates the amount of biofuel to be supplied by the biofuel supply means on the basis of the detected temperature and viscosity and engine speed or load and controls the biofuel supply means so that the amount (flow) of the biofuel supply means supplies the calculated amount (flow) of biofuel.

Not all of the fuel supplied to the fuel injection apparatus is injected into the combustion chamber, and a part of the fuel is returned to the fuel tank. Therefore, the percentage of biofuel increases gradually in a conventional fuel tank of two kinds of tanks, the conventional fuel tank and a biofuel tank.

Unless the conventional fuel tank is replenished with conventional fuel, the percentage of biofuel in the fuel supplied to the fuel injection apparatus increases gradually, for the fuel containing biofuel in the conventional fuel tank, in which biofuel percentage increases gradually, is supplied to the injection apparatus with the biofuel supplied from the biofuel supply means added at the inlet to the injection apparatus.

Lubricity depends mainly on the viscosity of fuel and the viscosity changes depending on the temperature of fuel.

Therefore, with the configuration described above, it is possible to prevent excessive mixing of biofuel at the entrance to the fuel injection apparatus and an appropriate amount of biofuel is added in accordance with engine speed or load, for the temperature and viscosity of the fuel with biofuel added to be supplied to the fuel injection apparatus are detected, the appropriate amount of biofuel to be supplied depending on engine speed or load is calculated on the basis of the detected temperature and viscosity, and the biofuel supply means is so controlled that the flow of biofuel coincides with the calculated value.

The present invention proposes a fuel injection system for an internal combustion engine provided with a fuel injection apparatus to pressurize the low-viscosity fuel supplied by a fuel supply pump by the plunger of the apparatus to feed the pressurized fuel to a fuel injection nozzle. A pressurized air supply means supplies pressurized air to the sliding part of the plunger of the fuel injection apparatus. A controller controls the pressurized air supply means so that the pressure of the pressurized air supplied to the sliding part of the plunger is kept to be higher than the evaporation pressure of the fuel in the sliding part of the plunger.

According to the invention, when fuel having low viscosity and evaporating easily, such as DME, which evaporates at a pressure of about 6 kg/cm$^2$ under normal temperatures as mentioned before, is used, pressurized gas is supplied to the sliding part of the plunger of the fuel injection apparatus by the pressurized gas supply means. The pressure of the pressurized gas is controlled to be higher than the evaporation pressure of low-viscosity fuel at the sliding part of the plunger. Accordingly, the occurrence of leakage of evaporated fuel of low viscosity from the fuel injection apparatus can be prevented.

In the invention, it is preferable that a temperature sensor is provided for detecting the temperature of the fuel supplied to the injection apparatus. The controller calculates the evaporation pressure of the fuel on the basis of the detected temperature and controls an air pressurizing pump constituting the pressurized air supply means so that the discharge pressure thereof is higher than the calculated evaporation pressure.

With the configuration, the discharge pressure of the pressurized gas supply pump is controlled to be higher than the evaporation pressure calculated on the basis of the detected fuel temperature, and the leakage of low-viscosity fuel due to evaporation can be completely prevented.

When the engine is brought to a stop with mixed fuel of biofuel or highly corrosive fuel and conventional fuel residing in the fuel injection apparatus, there are possibilities that rusting starts on the components of the apparatus and that the fuel degenerates into a tarry state to adhere to the components.

According to the invention, the problems caused by biofuel or highly corrosive fuel are prevented by operating the engine only using conventional fuel before the engine is brought to a stop. Also it is possible to limit the necessity of rust-proofing or anti-corrosion treatment only to the fuel tank. When restarting, the engine is started on conventional fuel, so, reliable engine staring is secured, and the occurrence of stagnation and white smoke in starting can be suppressed.

The invention is applicable to both cases, the case of a fuel injection apparatus of electromagnetic controlled unit injector in which fuel injection timing and injection quantity are controlled by opening and closing of an electromagnetic valve, and the case of a mechanical type fuel injection apparatus in which fuel injection quantity are controlled by shifting a fuel control rack controlled by a governor.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only and not as limitative of the scope of the present invention.

Figure 1:
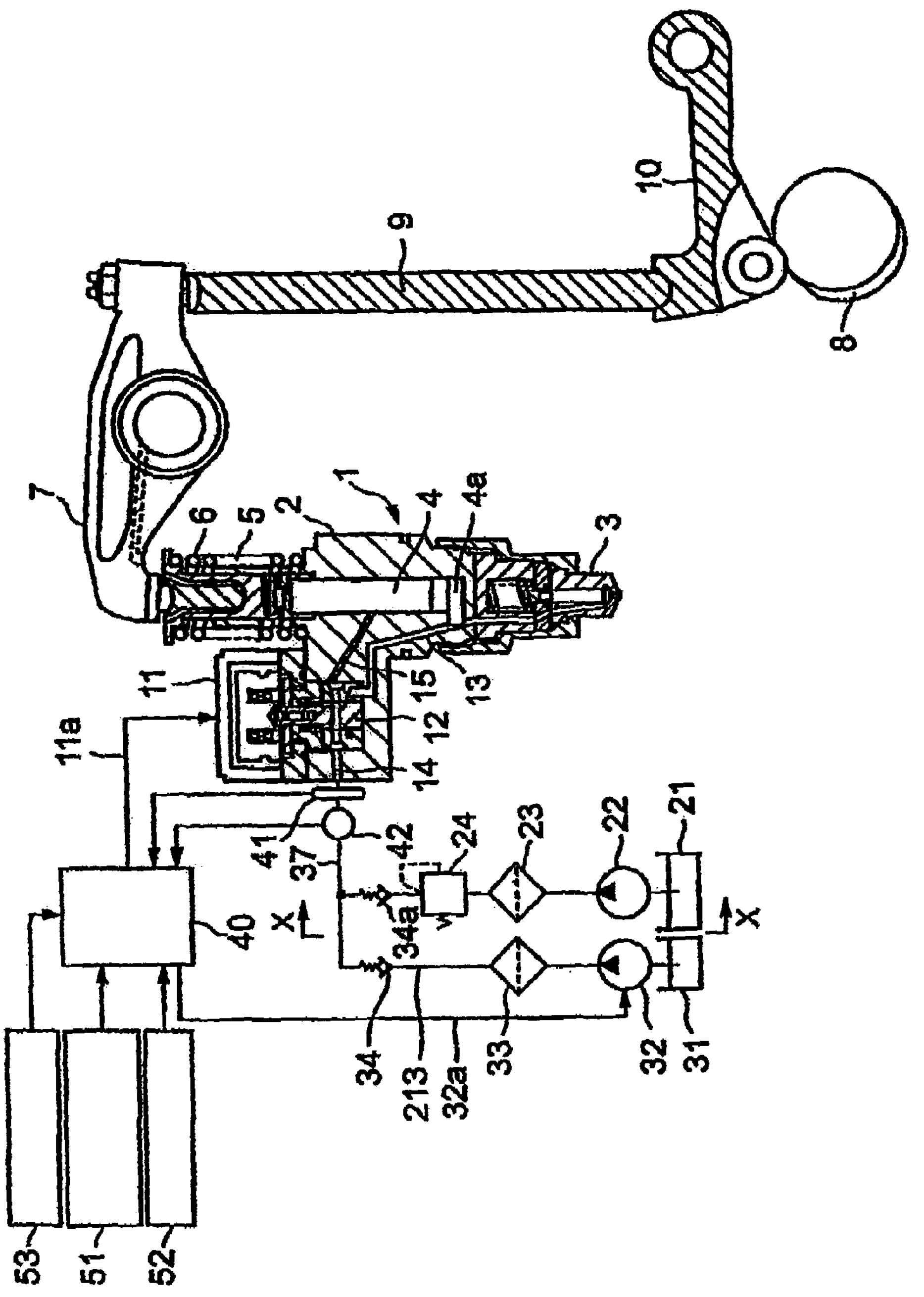
FIG. 1 is a representation showing an overall configuration of a first embodiment of a fuel injection system for a diesel engine according to the present invention, including a partial sectional view.
Figure 2:
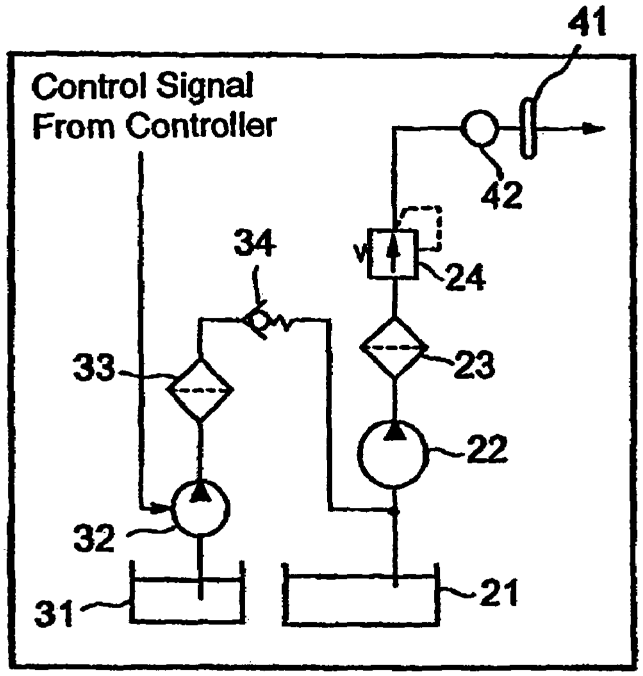
FIG. 2 is a block diagram showing another embodiment of a path for adding a lubricity improver to low viscosity fuel in the first embodiment of the fuel injection system.
Figure 3:
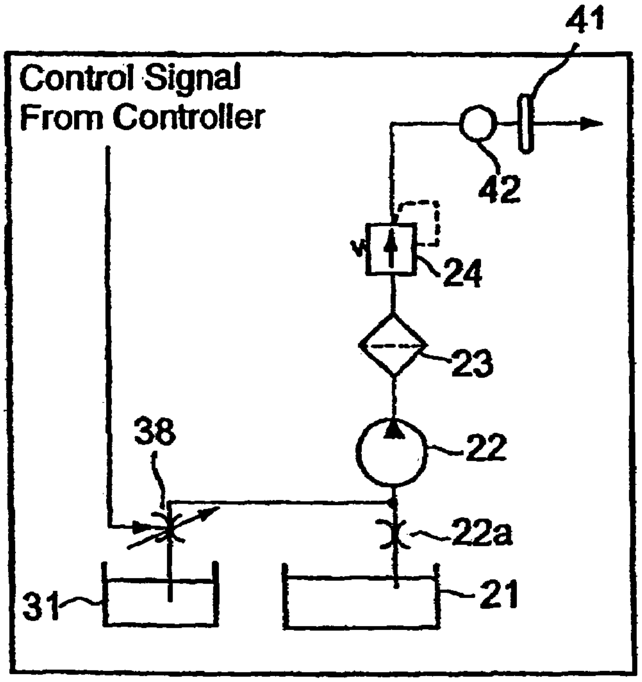
FIG. 3 is a block diagram showing still another embodiment of the path for adding a lubricity improver to low viscosity fuel in the first embodiment of the fuel injection system.

FIG. 1 is a representation showing the overall configuration of a first embodiment of the fuel injection system for diesel engine according to the present invention including partial sectional view. FIG. 2 is a block diagram showing another embodiment of the path for adding a lubricity improver to low viscosity fuel in the first embodiment of the fuel injection system, and FIG. 3 is a block diagram showing still another embodiment of the path for adding a lubricity improver to low viscosity fuel in the first embodiment of the fuel injection system.

Figure 4:
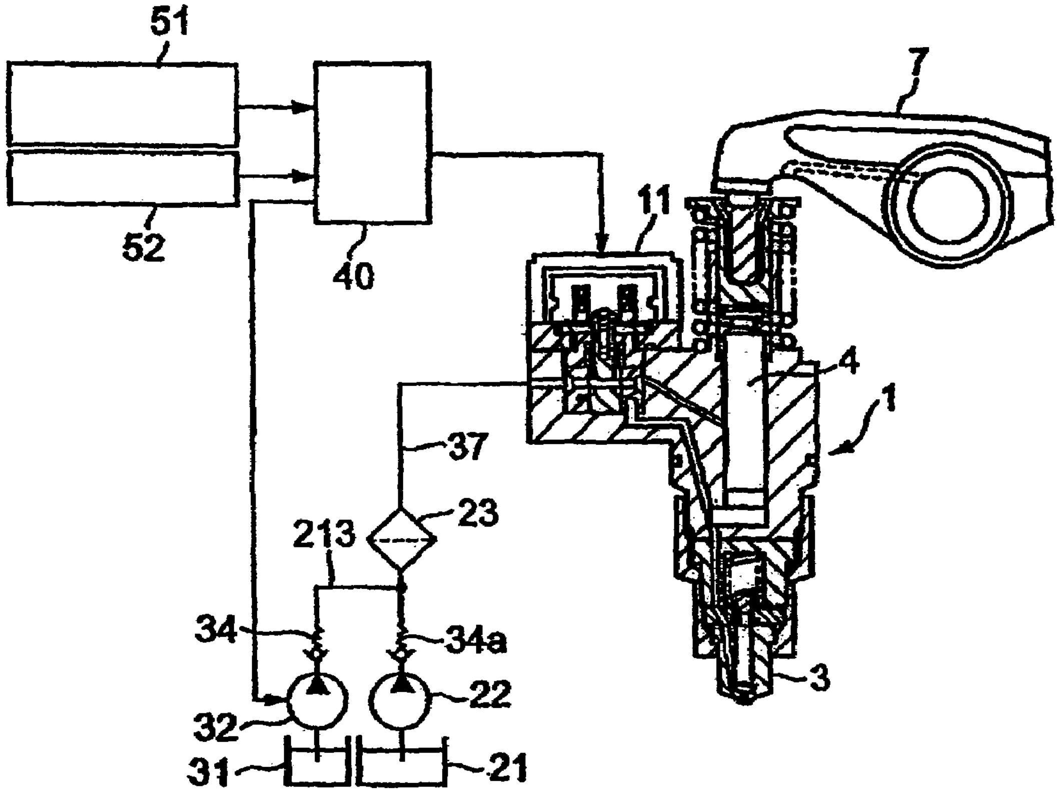
FIG. 4 is a representation showing an overall configuration of a second embodiment corresponding to FIG. 1.
Figure 5:
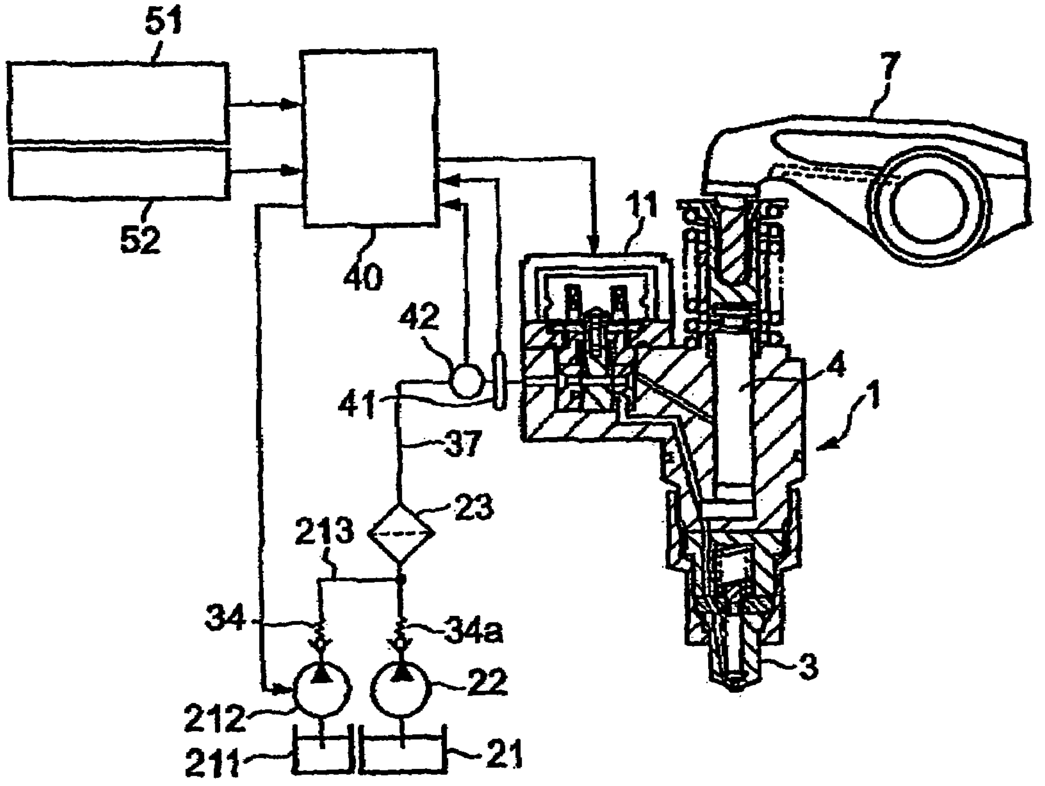
FIG. 5 is a representation showing an overall configuration of a third embodiment corresponding to FIG. 1.
Figure 6:
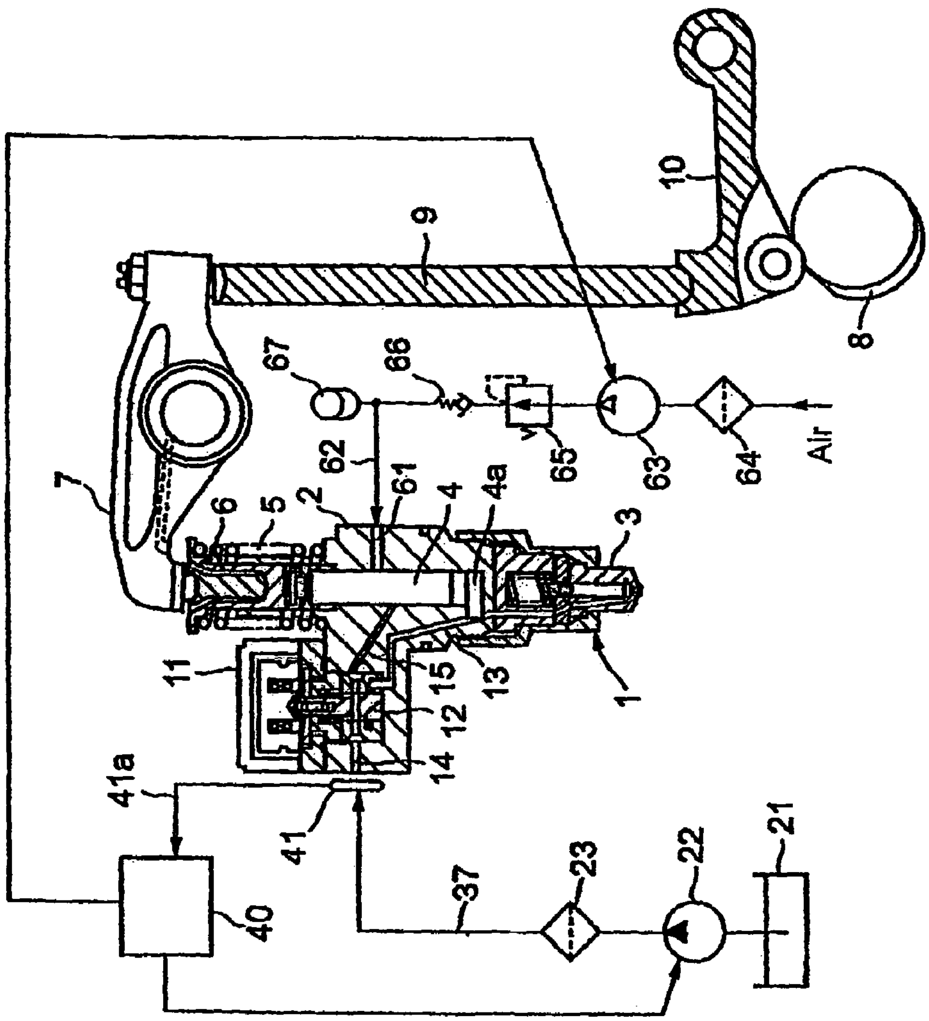
FIG. 6 is a representation showing the overall configuration of a fourth embodiment corresponding to FIG. 1.
Figure 7:
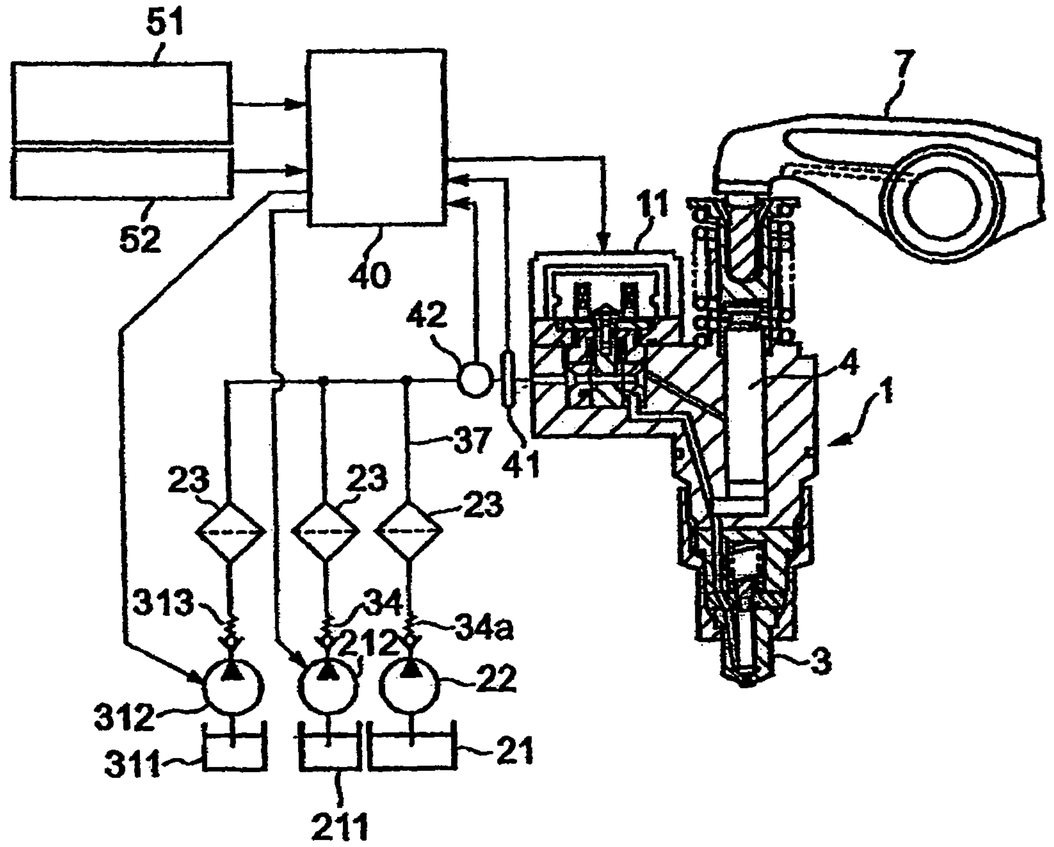
FIG. 7 is a representation showing an overall configuration of a fifth embodiment corresponding to FIG. 1.
Figure 8:
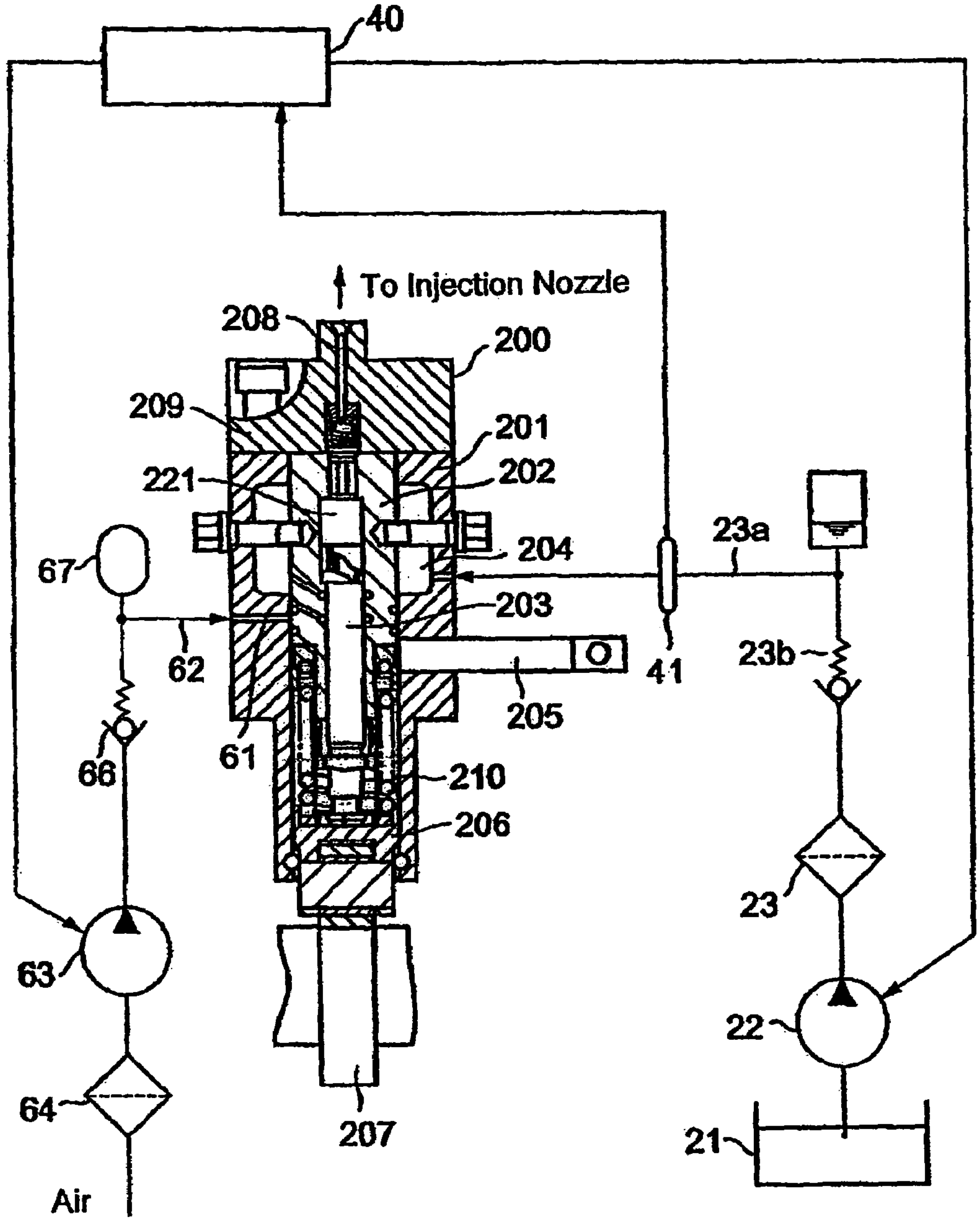
FIG. 8 is a representation showing an overall configuration of a sixth embodiment of the fuel injection system in which the present invention is applied to a mechanical fuel injection apparatus.
Figure 9A:
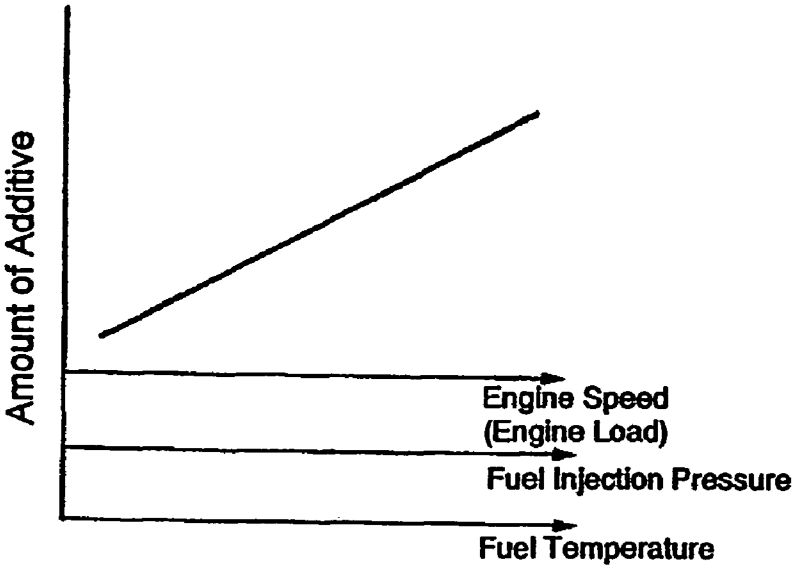
FIGS. 9A, 9B, and 9C are graphs for explaining the controlling of additive flow, biofuel flow, and air pressure supplied to the sliding part of the plunger by the controller of the present invention.
Figure 9B:
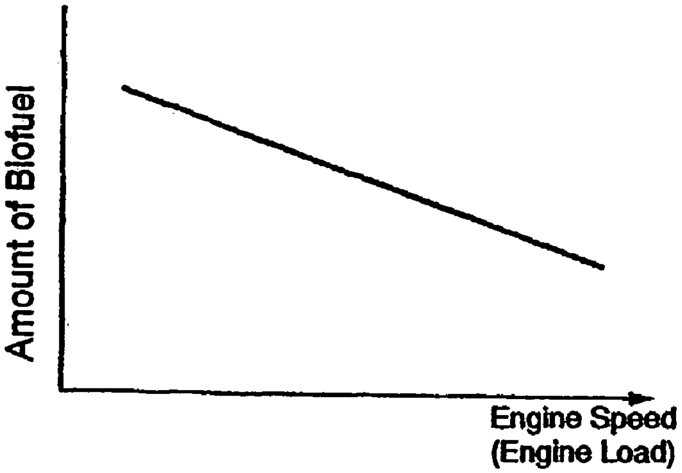
Figure 9C:
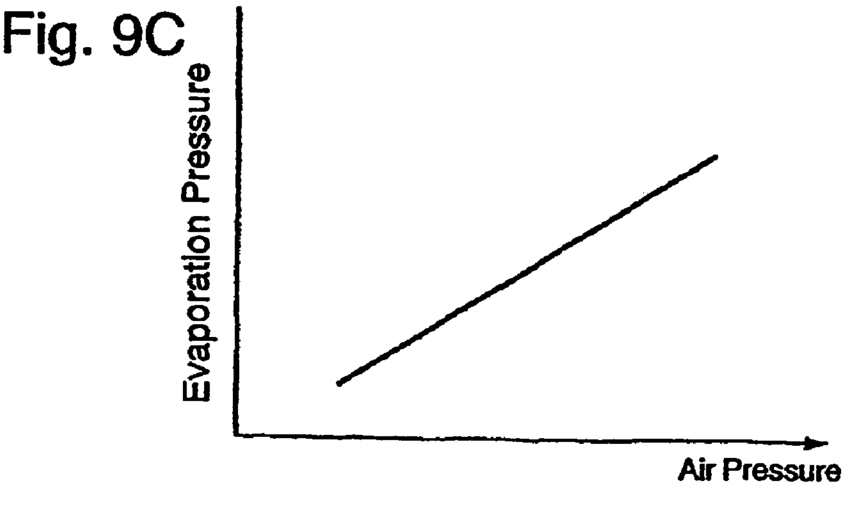

FIG. 4 is a representation showing the overall configuration of a second embodiment corresponding to FIG. 1, FIG. 5 is a representation showing the overall configuration of a third embodiment corresponding to FIG. 1, FIG. 6 is a representation showing the overall configuration of a fourth embodiment corresponding to FIG. 1, and FIG. 7 is a representation showing the overall configuration of a fifth embodiment corresponding to FIG. 1. FIG. 8 is a representation showing the overall configuration of a sixth embodiment of the fuel injection system in which the present invention is applied to a mechanical fuel injection apparatus. FIGS. 9A, 9B, and 9C are graphs for explaining the controlling of additive flow, biofuel flow, and air pressure supplied to the sliding part of the plunger by the controller of the present invention.

The First Embodiment

Referring to FIG. 1 showing the first embodiment, reference numeral 1 is a fuel injection apparatus. An electromagnetic type unit injector is used as the fuel injection apparatus 1 in the embodiment. This type of unit injector is well known and will be briefly explained hereunder. The unit injector 1 comprises a pump case 2, an injection nozzle 3, a plunger 4, a tappet 5, and a spring 6, and further includes an electromagnetic valve device 11 and an open/close valve device 12.

The plunger 4 is reciprocated up and down by means of a drive mechanism composed of a fuel cam 8, a cam follower 10, a push rod 9, a rocker arm 7, and the plunger spring 6 and tappet 5. Reference numeral 13 is a high-pressure fuel passage which communicates to a plunger chamber 4*a*, and 14 is a fuel inlet passage which is connected to a fuel supply path 37 mentioned later. Reference numeral 15 is a leak passage through which the fuel leaked from the clearance of the sliding part of the plunger 4 is introduced to the fuel inlet passage 14 (low-pressure fuel passage).

Reference numeral 21 is a low-viscosity fuel tank, 22 is a low-viscosity fuel supply pump, 23 is a filter, 24 is a pressure adjusting valve, and 34*a* is a non-return valve which permits fuel to flow only in the direction to the fuel injection apparatus 1. These members constitute a fuel supply path to the fuel injection apparatus 1.

The fuel in the fuel tank 21 is supplied by the fuel supply pump 22 to the peripheral part of the open/close valve device 12 and returns to the fuel tank through a return passage (not shown in the drawing) to circulate always between the fuel tank 21 and peripheral part of the open/close valve device 12.

In the low-viscosity fuel tank 21, fuel that evaporates easily at normal temperatures (in the case of dimethyl ether, it evaporates at about 6 $kg/cm^2$ under normal temperatures) is contained in a liquid state under pressure.

Reference numeral 31 is an additive tank containing a lubricity improver. Additives of fatty acid group or ester group are suitable for lubricity improvers. Reference numeral 213 is an additive passage, 32 is an additive supply pump, 33 is a filter, and 34 is a non-return valve. These members constitute an additive supply path. The non-return valve 34 is to prevent the fuel returning from the plunger chamber 4*a* from returning to the additive passage side. Therefore, the additive is allowed to flow only toward the injection apparatus 1 from the additive supply pump 32.

Reference numeral 37 is a fuel inlet path connecting the low-viscosity fuel supply path and the additive supply path to connect both of the paths together to the fuel inlet passage 14 of the fuel injection apparatus 1.

Reference numeral 40 is a controller for performing computation and control as mentioned later. 41 is a temperature sensor for detecting the temperature of low-viscosity fuel after the lubricity improver is added. 42 is a viscosity sensor for detecting the viscosity of low-viscosity fuel after the lubricity improver is added.

Reference numeral 51 is a rotation speed sensor for detecting engine rotation speed, 52 is a load sensor for detecting engine load, and 53 is a pressure sensor for detecting injection pressure.

The temperature detected by the temperature sensor 41, the fuel viscosity detected by the viscosity sensor 42, the fuel injection pressure detected by the pressure sensor 53, the engine rotation speed detected by the rotation speed sensor 51, and the engine load detected by the load sensor 52 are inputted to the controller 40. Although not shown in the drawing, the crank angle of the engine is detected as necessary and inputted to the controller 40.

In the fuel injection system configured like this, the system is controlled by the controller 40 so that the amount of additive (lubricity improver) added to the low-viscosity fuel is increased with increase in engine load and rotation speed as shown in FIG. 9(A).

The controller 40 calculates the required amount of additive to be added in accordance with engine operation conditions on the basis of the detected fuel temperature inputted from the temperature sensor 41 and the detected engine load inputted from the rotation speed sensor 52 as shown in FIG. 9(A). The calculated amount of additive is sent to the additive supply pump 32 and the pump is controlled to discharge the additive of the calculated amount.

The amount of additive calculated in accordance with engine operating conditions is sent to the electromagnetic valve device 11 via a line 11*a*, and fuel injection quantity and injection timing are controlled in accordance with engine operation conditions.

As mentioned above, in the first embodiment, the amount of the additive added to low-viscosity fuel is controlled to be increased with increase in engine rotation speed and load, for the larger the fuel injection quantity, the higher the injection pressure, and lubrication conditions become severe due to increased load exerted on the plunger caused by increased injection pressure.

Since the amount of the additive (lubricity improver) is increased as the severity of lubrication increases, the lubricating condition in the sliding part of the plunger 4 is maintained good with the addition of additive in an amount appropriate to give no harm to engine performance, and wear or sticking of the plunger can be avoided even when low-viscosity fuel is used.

In the first embodiment, not all of the fuel supplied to the injection apparatus is injected into the combustion chamber (not shown in the drawing), but a part of the fuel is returned to the fuel tank 21. Therefore, the concentration of additive (lubricity improver) increases gradually unless fuel is newly supplied to the fuel tank 21.

On the other hand, the condition of lubrication in the sliding part of the plunger depends mainly on the viscosity of the fuel, and the viscosity varies depending on its temperature.

According to the first embodiment, excessive addition of the additive at the fuel inlet passage of the fuel injection apparatus can be avoided and an appropriate amount of the additive is always supplied in accordance with engine rotation speed and load by detecting the temperature and viscosity of the low-viscosity fuel after the additive is added, by calculating with the controller 40 the required amount of the additive (lubricity improver) which depends on the engine rotation speed and load on the basis of the detected temperature and viscosity, and by controlling the additive supply pump 32 to discharge the calculated amount of the additive.

FIG. 2 shows another embodiment of the path for adding an additive (lubricity improver) to low-viscosity fuel.

The difference of the embodiment from FIG. 1 is that the discharge passage of the additive supply pump 32 is connected to the suction passage of the low-viscosity fuel supply pump 22 and a non-return valve which permits the flow of the additive only in the direction toward the low-viscosity fuel supply pump 22 is provided in the discharge passage of the additive supply pump 32.

In this embodiment, as the additive is sucked in the low-viscosity fuel supply pump 22, the additive contributes also to the lubrication of the supply pump 22. In this case, the non-return valve 34 may be omitted.

FIG. 3 shows still another embodiment of the path for adding an additive (lubricity improver) to low-viscosity fuel.

The difference of the embodiment from FIG. 1 is that the additive supply pump 32 and filter 33 are not provided, the additive is sucked by the low-viscosity fuel supply pump 22, and a variable throttling valve 38 is provided in the additive suction passage. The variable throttling valve 38 is controlled by the control signal from the controller 40 to adjust the flow of the additive.

With this configuration, the additive supply pump 32 and filter 33 can be omitted. A restriction 22*a* provided in the suction passage of the low-viscosity fuel pump 22 represents that the area of the suction passage of the low-viscosity fuel pump 22 is determined in relation to the range of variation of the passage area of the variable throttling valve 38.

A non-return valve may be provided between the variable throttling valve 38 and the suction passage of the low-viscosity fuel pump 22.

The Second Embodiment

FIG. 4 shows the overall configuration of the second embodiment of the fuel injection system. The fuel injection apparatus 1 and its drive mechanism are the same as those of the first embodiment shown in FIG. 1, and explanation is omitted.

The same components as that of FIG. 1 are indicated with the same reference numerals, and some reference numerals are omitted.

In the second embodiment, the temperature sensor 41 and viscosity sensor 42 of the first embodiment, for detecting the temperature and viscosity of the low-viscosity fuel after the additive (lubricity improver) is added, are omitted.

The relation between the engine speed or load and a flow of low-viscosity fuel provided with the lubricity improver so that the fuel added with the lubricity improver has proper lubricity is set beforehand in the controller 40, and the flow of the additive supplied by the pump 32 is controlled so that the flow of the additive is related to the flow set beforehand of the low-viscosity fuel.

With the second embodiment, even though the temperature sensor and viscosity sensor for detecting the temperature and viscosity of the low-viscosity fuel are not provided, an appropriate amount of the additive (lubricity improver) can always be supplied in accordance with engine speed and load, for a flow of low-viscosity fuel added with the lubricity improver so that the fuel added with the lubricity improver has proper lubricity is set beforehand in relation to the engine operating condition and additive flow is controlled in accordance with the flow set beforehand of the low-viscosity fuel.

The Third Embodiment

Referring to FIG. 5 showing the third embodiment of the fuel injection system according to the present invention, reference numeral 211 is a tank for containing biofuel, 212 is a biofuel supply pump, and 34 is a non-return valve which permits the flow from the biofuel supply pump 212 to flow only in the direction toward the injection apparatus 1. The biofuel flows from the biofuel tank 211 through the biofuel supply pump 212, the non-return valve 34, and a fuel passage 213 to be mixed with the conventional fuel sent from a fuel tank 21. The mixed fuel of biofuel and conventional fuel is introduced to the fuel injection apparatus 1 via a fuel path 37.

Reference numeral 40 is a controller which performs calculation and control as mentioned later, 41 is a temperature sensor provided in the fuel inlet path 37 for detecting the temperature of the fuel after the conventional fuel is mixed, and 42 is a viscosity sensor for detecting the viscosity of the mixed fuel.

Reference numeral 51 is a rotation speed sensor for detecting engine rotation speed, and 52 is a load sensor for detecting engine load.

The temperature detected by the temperature sensor 41, the fuel viscosity detected by the viscosity sensor 42, the fuel injection pressure detected by the pressure sensor 53, the engine rotation speed detected by the rotation speed sensor 51, and the engine load detected by the load sensor 52 are inputted to the controller 40.

Although not shown in the drawing, the crank angle of the engine is detected as necessary and inputted to the controller 40.

The construction of the injection pump apparatus 1 is the same as that of FIG. 1, the same component is indicated with the same reference numeral, and explanation is omitted.

If biofuel, which is superior in regard to the generation of NOx, exhaust smoke, and exhaust emission, is mixed with conventional fuel and the mixed fuel is injected into the combustion chamber of the engine, the exhaust emission will be improved. On the other hand, the lubricating condition in the sliding part of the plunger deteriorates when biofuel, which has low viscosity and poor lubricity, is increased.

In the third embodiment, setting is done in the controller 40 so that biofuel flow decreases with increasing engine speed and load as shown in FIG. 9(B).

The controller 40 calculates an appropriate flow of biofuel to keep the lubricity of the mixed fuel in accordance with engine speed and load on the basis of the temperature detected by the temperature sensor 41, the viscosity detected by the viscosity detector 43, and the detected values of engine speed and load, and the biofuel flow of the biofuel supply pump 212 is controlled to adjust the flow to the calculated value.

Therefore, with the third embodiment, biofuel flow is controlled so that biofuel flow is decreased to increase the percentage of conventional fuel as engine speed or load increases and lubricating conditions deteriorate. By this, the occurrence of wear or sticking of the plunger can be avoided while keeping improved exhaust gas including NOx emission and exhaust smoke by virtue of biofuel mixing.

As the lubricity of the fuel supplied to the fuel injection apparatus can be adjusted by adjusting the mixing ratio of biofuel and conventional fuel, an expensive additive is not required.

In the third embodiment, the percentage of biofuel in the fuel contained in the fuel tank 21 for containing conventional fuel changes gradually, for the mixture of biofuel and conventional fuel not injected is returned from the fuel injection apparatus 1 to the fuel tank 21.

Therefore, the biofuel concentration of the fuel supplied from the fuel tank 21 to be introduced to the fuel injection apparatus 1 increases gradually unless conventional fuel is newly supplied to the fuel tank 21. Lubricity of the fuel mixed with biofuel decreases with increasing percentage of biofuel.

According to the third embodiment, excessive mixing of biofuel into conventional fuel at the fuel inlet passage of the fuel injection apparatus can be avoided and an appropriate amount of biofuel is always mixed in accordance with engine rotation speed and load by detecting the temperature and viscosity of the low-viscosity fuel after the additive is added, by calculating the required amount of the additive (lubricity improver) which depends on the engine rotation speed and load on the basis of the detected temperature and viscosity, and by controlling the biofuel supply pump to discharge the calculated amount of biofuel. By this, the occurrence of situation can be prevented that the lubrication condition in the sliding part of the plunger is deteriorated due to excessive mixing of biofuel into conventional fuel.

The construction in the fuel injection apparatus 1 is the same as that of the first embodiment shown in FIG. 1 and the same component is indicated by the same reference numeral.

The Fourth Embodiment

In the fourth embodiment shown in FIG. 6, a pressurized gas supply means for supplying pressurized gas (may be air) is provided, and a controller 40 controls the gas supply means to keep the pressure of the gas to be above the evaporation pressure of the fuel.

In FIG. 6, reference numeral 61 is an air supply hole communicating to the sliding part of the plunger 4. Reference numeral 62 is an air passage connected to the air supply hole 61. The air passage 62 is provided with an air cleaner 64 for cleaning the air (atmospheric air), an air pump 63 for pressurizing the air, an air pressure adjusting valve 65, and a non-return valve 66 which allows the flow only in the direction toward the fuel injection apparatus 1 from the air pump 63. Reference numeral 67 is an accumulator for storing the pressurized air.

The fuel injection apparatus 1 is composed the same as that of FIG. 1 in the point other than that mentioned above, the same components are indicated with the same reference numerals and explanation is omitted.

Reference numeral 21 is a low-viscosity fuel tank for containing low-viscosity fuel such as dimethyl ether that evaporates easily (evaporates under relatively low pressure) at normal temperatures, 22 is a low-viscosity fuel supply pump, 23 is a filter, and 37 is a fuel path connected to the low-pressure fuel passage 14 of the fuel injection apparatus 1.

The low-viscosity fuel such as dimethyl ether that evaporates under relatively low pressure is contained in the low-viscosity fuel tank 21 in a liquid state (in the case of dimethyl ether, the pressure in the tank is kept above about 6 $kg/cm^2$).

Reference numeral 40 is a controller for performing calculation and control, 41 is a temperature sensor provided in a fuel inlet path 37 for detecting the temperature of the low-viscosity fuel supplied to the fuel injection apparatus 1, and the temperature detected by the temperature sensor 41 is inputted to the controller 40.

In the fourth embodiment, the pressurized air compressed by the air compressor to a required pressure is always, i.e. constantly, supplied to the sliding part of the plunger via the air passage 62 and air supply hole 61.

The controller 40 calculates the evaporation pressure on the basis of the fuel temperature detected by the temperature sensor 41 and controls the discharge pressure of the air pump 63 to be above the calculated evaporation pressure. In other words, the controller 40 controls the air pump 63 so that the air pressure is increased as the fuel temperature increases as shown in FIG. 9(C) in the case low-viscosity fuel such as dimethyl ether, which evaporates under relatively low pressure, is used in order to prevent the fuel in the sliding part of the plunger from evaporating. Further, the controller 40 controls the discharge of the low-viscosity fuel supply pump 22 in accordance with engine load and speed.

According to the fourth embodiment, when using low-viscosity fuel such as DME (dimethyl ether) having low viscosity and evaporating under relatively low pressure (dimethyl ether evaporates under pressure of about 6 $kg/cm^2$ as mentioned before), the occurrence of evaporation of the fuel and accordingly leakage of the fuel from the fuel injection apparatus can be avoided by supplying the pressurized air compressed by the compressor 63 to the sliding part of the plunger. The discharge pressure of the air compressor is controlled by the controller so that the discharge pressure is higher than the evaporation pressure of the fuel in the sliding part of the plunger.

The Fifth Embodiment

In the fifth embodiment shown in FIG. 7, a tank 311 for containing alternate fuel to substitute for petroleum fuel is provided in addition to biofuel tank 211 and conventional fuel tank 21 of the third embodiment shown in FIG. 5. In FIG. 7, reference numeral 312 is a supply pump for supplying the alternate fuel to substitute for petroleum fuel contained in the fuel tank 311 to the fuel injection apparatus 1, 313 is a non-return valve for allowing the fuel to flow only in the direction toward the fuel injection apparatus 1, and 23 is a filter.

In the fifth embodiment, a fuel tank for containing conventional fuel 21, anther fuel tank for containing biofuel 211, and still another fuel tank 311 for containing alternate fuel other than biofuel are provided as described above.

In the embodiment, the controller 40 calculates an appropriate flow of alternate fuel other than biofuel supplied by the supply pump 312 and an appropriate flow of biofuel supplied by the supply pump 212 in accordance with engine speed and load.

With the embodiment, lubricity of the fuel mixture of conventional fuel, biofuel, and alternate fuel other than bio fuel such as DME or GTL is adjusted by adjusting a mixing ratio of them, and an expensive additive is not required.

The Sixth Embodiment

The sixth embodiment shown in FIG. 8 is a case where the configuration of the forth embodiment shown in FIG. 6 is applied to a well known jerk pump type fuel injection apparatus 1 and the electromagnetic unit injector type fuel injection apparatus 1 in FIG. 6 is replaced by the jerk pump type fuel injection apparatus 200.

Regarding the jerk pump type fuel injection apparatus 200, reference numeral 201 is a pump case, 202 is a plunger barrel, 203 is a plunger inserted in the plunger barrel 202 for reciprocation, 204 is a fuel supply space, 205 is a control rack for controlling fuel injection quantity, 206 is a tappet, 210 is a spring, 207 is a fuel cam, 208 is a fuel outlet, and 209 is a delivery valve.

The tappet 206 is reciprocated by the rotation of the fuel cam 207 and the elastic force of the spring 210. When the plunger moves up, the suction port and exit port (these ports are not shown in the drawing) of the plunger barrel 202 are closed by the plunger and the fuel in the plunger space 211 is compressed, and the fuel compressed to high pressure is introduced to a fuel injection nozzle (not shown in the drawing) passing through the delivery valve 209 and fuel outlet 208.

In the embodiment, air pressurized to a required pressure by an air pump 63 is supplied to the sliding part of the plunger 203 of the jerk pump type fuel injection apparatus 200 through a filter 64, a non-return valve 66, an air passage 62, and air an supply hole 61 as is the case in the fourth embodiment.

It is also suitable to replace the fuel injection apparatus 1 (electromagnetic type unit injector) in the first, second, and third embodiments by the jerk pump type fuel injection apparatus 200. In this case, it is suitable to compose such that the controller 40 controls to shift the control rack to adjust fuel injection quantity.

According to the present invention, the occurrence of wear or sticking of the plunger caused by the increase in severity of lubrication condition in the sliding part of the plunger when fuel injection pressure increases corresponding to increased engine load and speed can be evaded even when low-viscosity fuel is used by keeping good lubricating condition in the sliding part of the plunger through the addition of a lubricity improver by an appropriate amount that does not affect the performance of the engine. As the addition of an appropriate amount of a lubricity improver becomes possible, the expensive lubricity improver can be used effectively.

Further, according to the invention, the occurrence of wear or sticking of the plunger caused by the increase in severity of lubrication condition in the sliding part of the plunger when fuel injection pressure increases corresponding to increased engine load and speed can be avoided by controlling the system so that the percentage of biofuel to conventional fuel is decreased while keeping improved exhaust gas including NOx emission and exhaust smoke by virtue of biofuel mixing.

As the lubricity of the fuel supplied to the fuel injection apparatus can be adjusted by adjusting the mixing ratio of biofuel to conventional fuel, expensive additive is not required.

Further, according to the invention, the leakage of evaporated fuel from the injection apparatus can be prevented when fuel which has low-viscosity and evaporates easily is used by supplying pressurized air to the sliding part of the plunger by a pressurized gas supplying means and controlling the pressure of the air to be higher than the evaporation pressure of the low-viscosity fuel in the sliding part of the plunger of the fuel injection apparatus.

According to the invention, a fuel injection system for an internal combustion engine can be provided, with which the occurrence of wear or sticking of the plunger by keeping good lubricity in the sliding part of the plunger through implementing means for keeping the lubricity of fuel in the sliding part of the plunger in a proper state for the lubrication therein when low-viscosity fuel is used, decrease in lubricity can be avoided while achieving improvement in exhaust emission when biofuel is used, and decrease in lubricity can be evaded by supplying pressurized air to the sliding part of the plunger when fuel evaporating easily such as DME is used.

What is claimed is:

1. A fuel injection system for an internal combustion engine, comprising:

a fuel injection apparatus, which comprises a plunger and fuel injection nozzle, for pressurizing a low-viscosity fuel that evaporates under relatively low pressure by using said plunger of said fuel injection apparatus to feed pressurized fuel to said fuel injection nozzle, said plunger having a sliding part in said fuel injection apparatus;

a fuel supply pump for supplying the low-viscosity fuel to said fuel injection apparatus;

an air supply hole communicating with said sliding part of said plunger of said fuel injection apparatus;

a pressurized air supply means for constantly supplying pressurized air to said sliding part of said plunger via said air supply hole; and a controller for controlling said pressurized air supply means so that the pressure of the pressurized air supplied to said sliding part of said plunger is maintained higher than the evaporation pressure of the low-viscosity fuel in said sliding part of said plunger so as to prevent the low-viscosity fuel from evaporating.

2. The fuel injection system of claim 1, and further comprising a temperature sensor for detecting the temperature of the low-viscosity fuel supplied to said fuel injection apparatus, wherein said pressurized air supply means comprises an air pressurizing pump, and wherein said controller calculates the evaporation pressure of the low-viscosity fuel on the basis of the temperature detected by said temperature sensor and controls said air pressurizing pump so that the discharge pressure of said air pressurizing pump is higher than the evaporation pressure calculated by said controller.

3. The fuel injection system of claim 2, wherein said fuel injection apparatus comprises an electromagnetically controlled unit injector in which fuel injection timing and quantity are controlled by opening and closing an electromagnetic valve.

4. The fuel injection system of claim 2, wherein said fuel injection apparatus is a mechanical fuel injection apparatus comprising a control rack controlled by a governor, fuel injection quantity being controlled by shifting said control rack.

5. The fuel injection system of claim 1, wherein said fuel injection apparatus comprises an electromagnetically controlled unit injector in which fuel injection timing and quantity are controlled by opening and closing an electromagnetic valve.

6. The fuel injection system of claim 1, wherein said fuel injection apparatus is a mechanical fuel injection apparatus comprising a control rack controlled by a governor, fuel injection quantity being controlled by shifting said control rack.

7. The fuel injection system of claim 1, wherein said fuel injection apparatus comprises a pump case in which said plunger slides, said air supply hole extending through said pump case to said sliding part.

8. The fuel injection system of claim 1, wherein said plunger is reciprocated by a drive mechanism that includes a fuel cam, can follower, push rod, rocker arm, plunger spring and tappet.

9. A fuel injection system for an internal combustion engine, comprising:

a fuel injection apparatus, which comprises a plunger and fuel injection nozzle, for pressurizing a low-viscosity fuel that evaporates under relatively low pressure by using said plunger of said fuel injection apparatus to feed pressurized fuel to said fuel injection nozzle, said plunger having a sliding part in said fuel injection apparatus;

a fuel supply pump for supplying the low-viscosity fuel to said fuel injection apparatus;

an air supply hole communicating with said sliding part of said plunger of said fuel injection apparatus;

a pressurized air supply for constantly supplying pressurized air to said sliding part of said plunger via said air supply hole;

a controller for controlling said pressurized air supply so that the pressure of the pressurized air supplied to said sliding part of said plunger is maintained higher than the evaporation pressure of the low-viscosity fuel in said sliding part of said plunger so as to prevent the low-viscosity fuel from evaporating.

10. The fuel injection system of claim 9, and further comprising a temperature sensor for detecting the temperature of the low-viscosity fuel supplied to said fuel injection apparatus, wherein said pressurized air supply comprises an air pressurizing pump, and wherein said controller calculates the evaporation pressure of the low-viscosity fuel on the basis of the temperature detected by said temperature sensor and controls said air pressurizing pump so that the discharge pressure of said air pressurizing pump is higher than the evaporation pressure calculated by said controller.

11. The fuel injection system of claim 10, wherein said fuel injection apparatus comprises an electromagnetically controlled unit injector in which fuel injection timing and quantity are controlled by opening and closing an electromagnetic valve.

12. The fuel injection system of claim 10, wherein said fuel injection apparatus is a mechanical fuel injection apparatus comprising a control rack controlled by a governor, fuel injection quantity being controlled by shifting said control rack.

13. The fuel injection system of claim 9, wherein said fuel injection apparatus comprises an electromagnetically controlled unit injector in which fuel injection timing and quantity are controlled by opening and closing an electromagnetic valve.

14. The fuel injection system of claim 9, wherein said fuel injection apparatus is a mechanical fuel injection apparatus comprising a control rack controlled by a governor, fuel injection quantity being controlled by shifting said control rack.

15. The fuel injection system of claim 9, wherein said fuel injection apparatus comprises a pump case in which said plunger slides, said air supply hole extending through said pump case to said sliding part.

16. The fuel injection system of claim 9, wherein said plunger is reciprocated by a drive mechanism that includes a fuel cam, can follower, push rod, rocker arm, plunger spring and tappet.

* * * * *